Dec. 17, 1963  A. A. VARELA  3,114,909
FREQUENCY MODULATED PULSE RADAR SYSTEM
Filed Sept. 4, 1957  4 Sheets—Sheet 1

INVENTOR
ARTHUR A. VARELA

BY
ATTORNEYS

Dec. 17, 1963   A. A. VARELA   3,114,909
FREQUENCY MODULATED PULSE RADAR SYSTEM
Filed Sept. 4, 1957   4 Sheets-Sheet 4
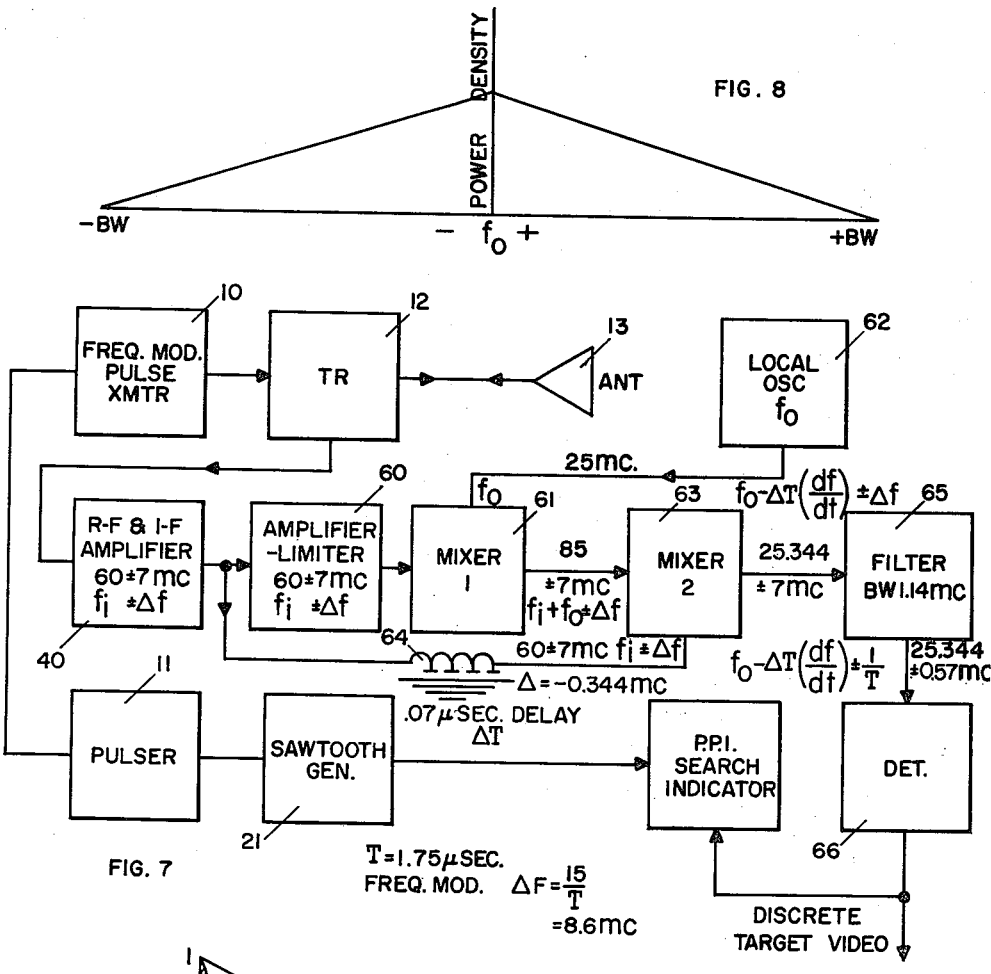
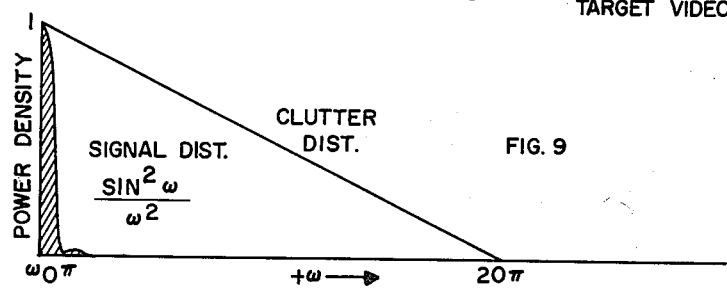
INVENTOR
ARTHUR A. VARELA
BY
ATTORNEYS United States Patent Office 3,114,909
Patented Dec. 17, 1963

3,114,909
FREQUENCY MODULATED PULSE
RADAR SYSTEM
Arthur A. Varela, Alexandria, Va., assignor, by mesne assignments, to Melpar, Inc., Falls Church, Va., a corporation of Delaware
Filed Sept. 4, 1957, Ser. No. 682,065
7 Claims. (Cl. 343—17.2)

The present invention relates generally to radar systems, and more particularly to frequency modulated pulse radar systems for detecting and/or tracking targets in the presence of clutter.

The general radar system type to which the present invention has particular reference is that which employs short pulses of wave energy, directing these toward a target, intercepting reflections or echos from the target, and measuring the time elapse between transmission of each pulse and reception of the corresponding echo. In such systems, wherein the target is located on or adjacent to ground or sea, problems are raised by echos or return from the latter, called "clutter," when there is coincidence in range between the "clutter" and the target, and especially when the "clutter" signal strength equals or exceeds the target signal strength. This condition occurs particularly when the target is an aircraft at low altitude and when both the target and the earth's surface are included in the effective beam pattern of the radar.

Techniques have been developed for distinguishing between reflecting objects on the basis of their relative velocities. Such techniques rely on Doppler effects, and have been relied on to distinguish moving objects from stationary reflecting objects, i.e., aircraft from terrain. Such techniques are not effective in distinguishing target from clutter in the case of airborne interception or AI radar equipments for various reasons related to the principles on which such systems operate, the frequencies employed, and the like.

A basic and fundamental distinction between target signals and clutter signals relates to the number of clutter echo components, and their random occurrences due to the random distribution of the clutter echo sources in space. It is a primary feature of the present invention to utilize the difference in spatial concentration of target and clutter sources, to distinguish between these.

An elemental area of clutter may be defined as the area established by the limits of resolution of a radar. Approximately such an area is equal to (1) $\Gamma R C \Theta$ where
$\Gamma$ is radar pulse length
R is range of clutter area
C is velocity of light
$\Theta$ is beam width in radians To provide typical values, a radar system having a beam of 4° and a half microsecond pulse sees a clutter area, at a range of 10 miles, which is 250 feet deep by 4000 feet wide. So large an area can be expected to contain a large number of regions or objects which provide significant back scatter. A clutter signal from such an area will be the complex sum of signals back scattered from these regions and objects. An aircraft or missile target, by comparison, provides a simple compact signal. It is a primary feature and object of the present invention to provide a system for distinguishing between target and clutter on the basis of the recited distinction between echos from a compact target and from a clutter area.

In accordance with one preferred modification of the present invention, each transmitted pulse in a radar system is frequency modulated. The pulse energy returned from a target is compact in time, and hence may be detected by amplitude demodulation. Assuming the pulse amplitude or envelope to be rectangular, amplitude detection may be accomplished by means including a filter which has sufficient band width to respond to a wave spectrum corresponding with the width of the echo pulse. Clutter energy is distributed over the F.M. band, so that a large portion of the clutter energy will not pass a suitable filtering system.

A constant frequency rectangular R.F. pulse can be shown to have amplitude in the interval $f$ to $f+\Delta f$, (1) $$g(f) \approx \frac{\sin \pi f \Gamma}{\pi f \Gamma}$$

when $f$ is frequency difference from the carrier or center frequency of the pulse and $\Gamma$ is pulse length. If there is a linear frequency change during the pulse such that the total change in frequency, V, is equal to or greater than about $4/\Gamma$, the total width of the spectrum is about 2V, and this width increases for $$V = \frac{a}{\Gamma}$$

as $a$ increases, $a$ being any numeral value. If, however, a frequency modulated pulse were received in a receiver having a bandwidth adequate to accept the entire spectrum of a frequency modulated pulse, and the response of the receiver were amplitude detected, the amplitude detector would provide the shape of the original pulse, i.e., its amplitude envelope. In the case of clutter signal a large number of frequency modulated pulses are returned which have irregular frequency differences at any given instant of time due to the differences in range from which the pulses are returned. Accordingly, readily distinguishable amplitude modulated pulses are not derivable from the clutter return.

In a fundamental sense, then, the last mentioned system involves the transmission to a target of small spatial extent, and to a clutter target of large spatial extent, of pulses which are so constituted by virtue of modulation other than amplitude modulation that their energy is distributed over a wide spectrum, i.e., far wider than is representative of pulse amplitude variation, receiving echo pulses in a receiver capable of receiving the entire spectrum, and selecting amplitude variations of the pulses by means of a detector and a relatively narrow band filter. In such case, echos deriving from a target of small extent retain distinguishable structure, and pulse shape or envelope can be reconstituted from the echo signal, while clutter signals present randomly intermixed wide band spectra, due to the large number of clutter sources, from which individual pulses cannot be reconstituted by amplitude detection and/or narrow band filtering.

While utilization of a broad band receiver and a low pass video filter presents one feasible elementary technique for separating target from clutter return, in a radar system which transmits frequency modulated pulses, some loss in sensitivity is incurred from the increased bandwidth prior to detection. Reduction from optimum sensitivity in a receiver of bandwidth $20/\tau$ is about 7 db, but in the video output thermal noise, like clutter, would be distributed over a $10/\Gamma$ band, and thereby a recovery of nearly $\sqrt{10}$ in power, or 5 db should be obtainable from the relatively narrow band video filter.

In accordance with another preferred modification of the present invention, a receiver is utilized in which the receiver local oscillator is caused to change frequency during reception of a target signal, this change duplicating the change of frequency of the transmitted pulse. The I.F. amplifier of the receiver then sees a constant frequency, and need have only a bandwidth of $1/\Gamma$ between half power points. If the variation of local oscillator frequency precisely duplicates the variation of frequency of an echo signal from a target in process of reception, it will not simultaneously be so varying during reception of a clutter pulse, and hence the receiver will discriminate against the latter.

I, therefore, provide a local oscillator which is gated on for an interval during each pulse to pulse period, for a time slightly greater than pulse duration, and change the frequency of the local oscillator, during the gating period, at the same rate as the transmitted pulse. The time position of the gate along a range trace may then be controlled to coincide with time of target pulse reception.

In order to control gate position the receiver may include two I.F. amplifiers or channels, each amplifier or channel having a bandwidth of about $2/\Gamma$, and a center separation between channels of about the same amount. The video outputs of the channels proceed to a comparison circuit which servos the gate position in tracking operation.

In search operation the gate is moved gradually over the search range. Since the signal is received at essentially full strength within $1/\Gamma$ on either side of the two filter center frequencies the limit on scan rate is $4/\Gamma$ per interpulse period. With a ½ microsecond pulse and a 2000 per second pulse repetition rate the search rate could be 4000 microseconds per second, or about 10 miles per .03 second.

In accordance with still another preferred embodiment of the present invention, received signals are compared with themselves, frequency-wise, but with a time offset. Utilization is thus made of auto-correlation techniques to reduce receiver noise.

The last mentioned system requires utilization of a broad-band receiver front end, to receive all the spectral components of frequency modulated pulses. Such wide band receivers admit excessive noise, and devices are therefore required to reduce this noise to that appropriate to a band-width appropriate to pulse envelope, apart from pulse carrier frequency modulation. Essentially, signal band width must be compressed, following the receiver front end, while both clutter and noise remain distributed over as wide a band as possible, pursuant to the principles on which the invention is based.

Receiver noise becomes essentially uncorrelated after an interval equal to receiver bandwidth. Therefore, if a receiver, or a broad-band element thereof, divides into two channels, in one of which a delay occurs substantially equal to the reciprocal of the receiver bandwidth, and if the noise signals in the two channels are compared, they will be found to be uncorrelated or independent. A constant difference of frequency will arise, however, between frequency modulated target pulses in the two channels, equal to the delay interval times the rate of frequency change. Hence, the desired target signal is correlated in the two channels.

In order to avoid modulation cross products in the difference frequency it is necessary that the center frequencies of the two channels be separated by more than the bandwidth. To provide this separation the signals in one of the channels are mixed with a C.W. signal from a local oscillator with the output applied to a filter which passes only the sum frequencies. Thus the frequencies present in one branch are changed, a fixed amount by the familiar heterodyne technique. The difference frequency center is then equal to the local oscillator frequency with a small offset due to the time delay. While there is some loss in power density of useful signal due to decrease of pulse overlap in the comparison device, this is negligible. For example, in the practice of the present invention it is contemplated to employ a bandwidth of twenty or more times the reciprocal of the pulse length. It can be shown that loss in effective pulse width due to reduction in overlap of pulses, in such circumstances, caused by passage through the two channels having the specified relative delay, will be 5% or less. During overlap, the target signals are correlated, with a constant difference frequency.

Clutter return, in contradistinction to target signal, contains at every instant of time all of the frequencies in the transmitted spectrum. The difference frequency band, i.e. the difference between signals deriving simultaneously from the delayed and undelayed channels, will have twice the frequency spread of the transmitted spectrum. Power density of the difference frequency spectrum will be maximum at the center of the band, with an approximately linear decrease in either side, and with zeros occurring at about plus and minus twice the total frequency modulation. However, the decrease is slow, so that filtering can remove most of the difference frequency energy.

It is, accordingly, a broad object of the present invention to provide a radar system having an increased ratio of target signal to clutter signal.

It is a further object of the invention to provide a system for transmitting frequency modulated pulses to a target for return thereby, for receiving echo pulses from a target together with superposed clutter signal, and to select the target pulse envelope from the clutter signal by concentrating the target pulse frequency spectrum and dispersing the clutter signal frequency spectrum, with respect to the pass band of a narrow band filter.

It is another object of the present invention to employ frequency modulation during pulsing a radar transmitter, a device for distinguishing targets from clutter.

It is a further object of the invention to distinguish clutter from target on the basis of the physical concentration of the target and the physical dispersion of the clutter.

It is still another object of the invention to reduce the energy density of detected clutter signal, in radar systems, by employing frequency modulated radar pulses to scatter the frequency spectrum of clutter response.

It is a more specific object of the present invention to provide a pulse radar system in which frequency modulated pulses are employed, the return pulses being detected by heterodyning with frequency modulated heterodyne signals, correlated in frequency with returned pulse frequency, the heterodyning signals being derived either from an independent oscillator, or by delaying the incoming radar pulses.

The above and still further objects, features and advantages of the present invention will become apparent upon consideration of the following detailed description of one specific embodiment thereof, especially when taken in conjunction with the accompanying drawings, wherein:

FIGURES 6 and 7 are preferred modifications of the system of FIGURE 5; and

FIGURES 8 and 9 are plots of power density versus frequency useful in explaining the system of FIGURE 8.

Figure 1:
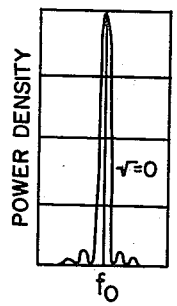
FIGURES 1–4 are energy density spectra for pulses having varying degrees of frequency modulation, FIGURE 4 being a composite of FIGURES 1–3 to the same scale.
Figure 2:
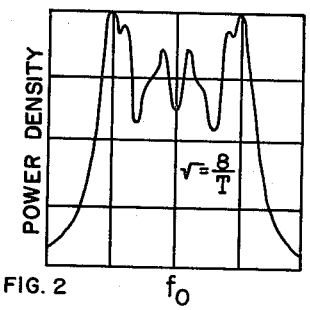
Figure 3:
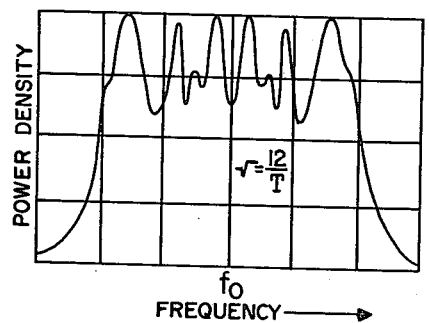

Referring now more particularly to the accompanying drawings, FIGURE 1 provides a graph of a frequency spectrum of a pulse having no frequency modulation, i.e., for which the total linear change in frequency V, over the pulse time, is zero. FIGURE 2 is a plot of frequency spectrum of a pulse for which $V=8/\Gamma$, when $\Gamma$ is pulse length, and FIGURE 3 is a plot corresponding generally with FIGURE 2, but with a value of $V=12/\Gamma$. These plots are not to the same scale amplitudewise, but are to the same scale frequencywise.

Figure 4:
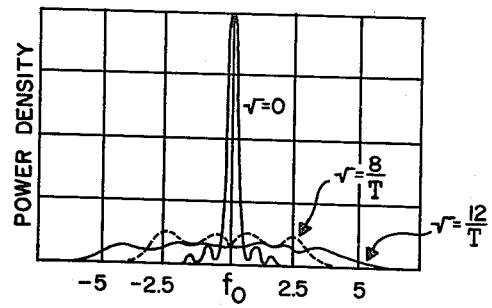

In FIGURE 4 is plotted the graphs of FIGURES 1–3, inclusive, against a common power density scale. The peak amplitude factors are $\frac{1}{13}$ and $\frac{1}{20}$ for the $8/\Gamma$ and $12/\Gamma$ frequency modulations, respectively, relative to the zero modulation case.

It appears from the graphs, FIGURES 1–4, that pulse energy is compact frequency-wise, when only pulse amplitude is considered, but that the spectrum becomes diffuse when frequency modulated pulses are considered.

the diffusion increasing with extent of frequency modulation relative to pulse length. The graphs may be plotted from $$[g(f)]^2 \approx \left[\frac{\sin \pi f \Gamma}{\pi f \Gamma}\right]^2$$

where $f$ is frequency difference from $f_0$, the center or carrier frequency.

Figure 5:
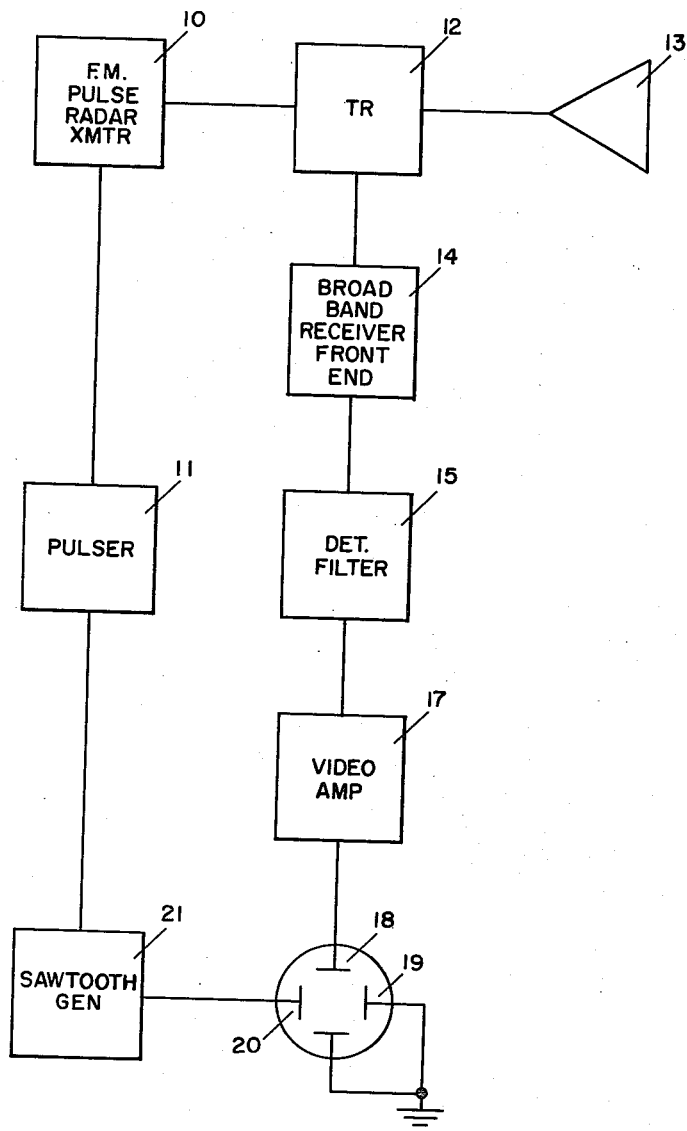
FIGURE 5 is a simple and generic form of radar system according to the invention.

In the system of FIGURE 5 is illustrated, in block form, the broad concept of a frequency modulated pulse radar system according to a first embodiment of the invention. The reference numeral 10 denotes an F.M. pulse radar transmitter, which is energized periodically or at random in response to pulses provided by a pulser 11. The R.F. pulses provided by the transmitter 10 are transmitted via a TR box 12 to an antenna 13, which radiates the pulses to a remote target, so located that multiple back-scattering objects are located adjacent thereto, in random locations. A typical situation is that encountered in airborne interception radar, or AI radar, where the target is at low altitude and the earth's surface is included in the effective beam pattern of the radar.

Echo signals, both from the target and from the earth, are produced and returned to the antenna 13. The target provides target pulses, while the early return signals are called clutter. The returned or echo signals proceed via TR switch 12 to a broadband receiver 14, having a bandwidth adequate to accept and pass the target and clutter pulse spectra, having regard for their frequency modulation. The output of receiver 14 is detected in a suitable amplitude detector and narrow band arrangement filter 15, followed by a video amplifier 17, these having a response bandwidth adequate only to translate without substantial distortion the envelope of the target pulse. The output of the latter is applied to the vertical deflection electrode 18 of a cathode ray tube indicator 19, for example, while a sawtooth deflection voltage is applied to the horizontal deflection electrode 20. The latter is derived from a sawtooth generator 21 synchronized from pulser 11, and having a rise rate appropriate to the radar ranges under surveillance.

In operation, an R.F. target pulse is compact, because derived from a compact target, and returns from the target in the same form as that in which it is transmitted, is amplified without distortion in receiver 14, converted into a pulse envelope in filter and detector 15 and indicated. Clutter return is diffuse, because each element thereof returns from a random range within the beam of the radar system, and hence is of different frequency than most other elements at any time instant. The resultant spectrum is random, and while it is amplified as received in the receiver 14, when detected and filtered and detected in device 15, provides an uncorrelated response, most of the energy of which falls outside the range of video amplifier 17.

Figure 6:
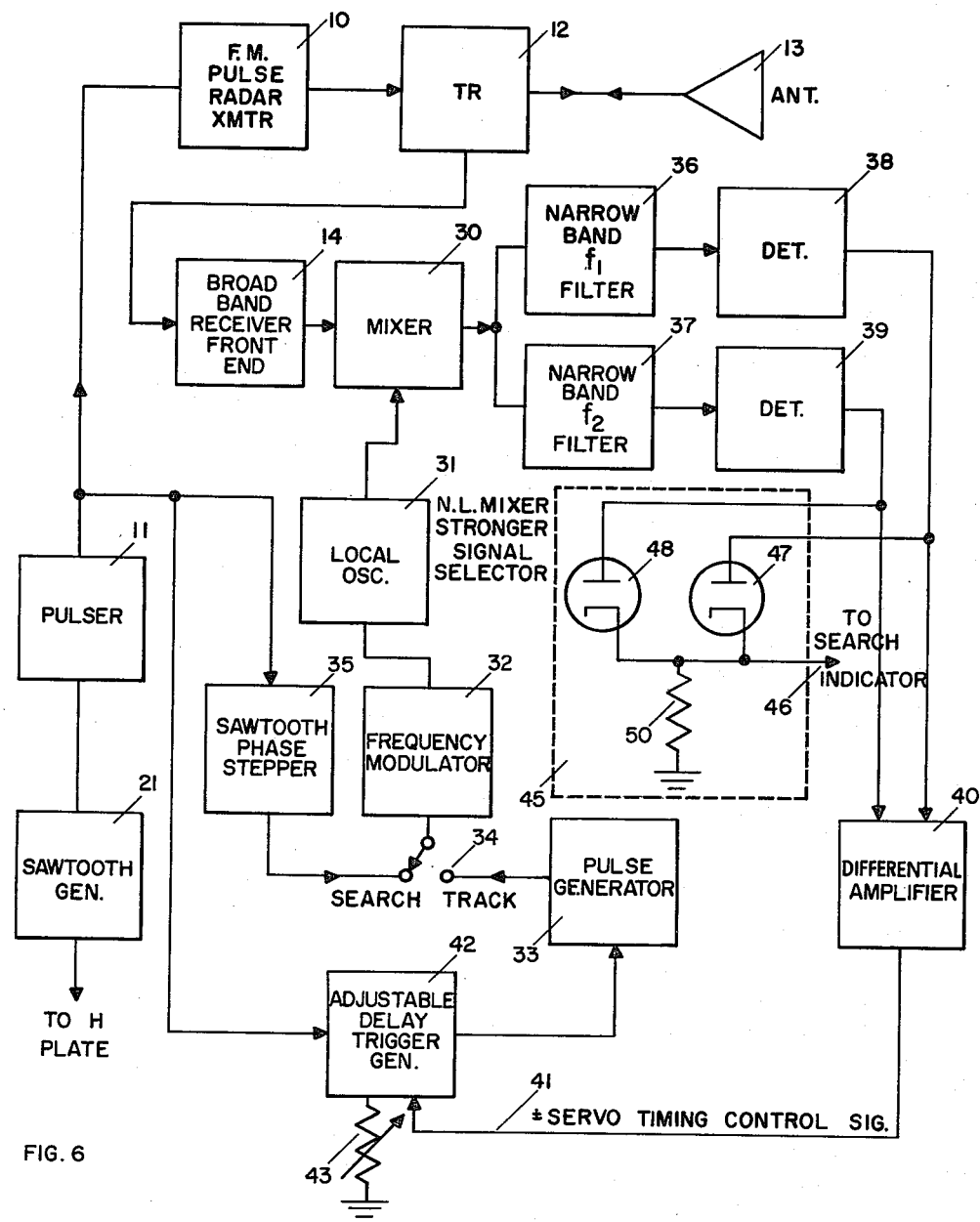

A modification of the system of FIGURE 5 is exemplified in detail in the system of FIGURE 6. In the latter system the component elements 10–14, inclusive, may duplicate the correspondingly numbered elements of the system of FIGURE 1. The output of receiver 14 is applied to a mixer 30, to which is also applied the output of a local oscillator 31, frequency modulated by a frequency modulator 32, capable of modulating the output of frequency of local oscillator 31 over the same range and in the same manner as the transmitted pulse, in response to a modulation control pulse provided by pulse generator 33. The control pulse may be supplied to modulator 32, at will, via a two position switch 34 in the "track" position thereof.

Pulses derived from pulser 11 may be applied, at will, to the frequency modulator 32 via a sawtooth phase stepper 35, and via the switch 34 in its "search" position. The sawtooth phase stepper applies successive pulses with slowly successively increased delay times, the increases of delay being linear.

The output of mixer 30 is split into two channels, 36 and 37, the channels being of different center frequencies $f_1$ and $f_2$, one slightly above and one slightly below the center frequency of the conversion spectrum of the mixer 30.

Each of filters 36 and 37 may have a bandwidth of about $2/\Gamma$, and the center separation of the filters may also be about $2/\Gamma$. The output of filter 36 may be detected in an amplitude detector 38, and the output of filter 37 in an amplitude detector 39. The outputs of the detectors 38 and 39 are subtracted in a differential amplifier 40, the output of which has an algebraic sign dependent on the relative magnitudes of the detector outputs, and hence is an error signal. The output of the differential amplifier 40 is applied over lead 41, to an electrically adjustable delay trigger generator 42 which controls the times of pulsing of pulse generator 33. A manual over-ride 43, for adjusting delay of generator 42, may be provided.

The outputs of detectors 38 and 39 are also supplied to a device 45 which selects the stronger output and applies same to a search indicator, via lead 46. The search indicator may be, for example, of the type illustrated in FIGURE 5.

The stronger signal selector 45 may consist of two diodes 47 and 48, the anodes of which are connected, respectively, to the detectors 38 and 39, and the cathodes of which may be connected in parallel to a common load 50, to which the lead 46 is connected. The stronger signal then develops a bias voltage in load 50 which blocks the weaker signal.

In operation, echo frequency modulated pulses are received and amplified in receiver 14, which may have adequate bandwidth to receive the pulses despite wide frequency modulation thereof. The received pulses are applied to a mixer 30.

Each transmitted pulse, which occurs while pulser 11 is pulsing, corresponds with a pulse applied to adjustable delay trigger generator 42, which delays the pulse according to range of the target. Assuming a perfectly selected delay time the output of trigger generator 42 starts pulse generator 33 just as a target pulse reaches mixer 30. Pulse generator 33 in turn controls frequency modulator 32 to gate on the normally inoperative local oscillator 31, and to sweep its frequency over a band as extensive as that to which the transmitted pulse is subjected, and with the same rate of change of frequency. The output of mixer 30 is then a constant frequency, since the frequencies applied thereto maintain a constant frequency difference. Since, however, the applied signals are pulse signals, their difference possesses a frequency spectrum (see FIGURE 1), which is divided equally between filters 36 and 37, i.e., pulse energy of the output of mixer 30, is supplied equally to both filters. In such case the differential amplifier 40 supplies zero output, and the adjustable delay trigger generator is not constrained to change timing. The stronger signal selector 45 selects both signals, effectively, and supplies a video signal to the indicator of the system.

In the event of shift failure of synchronism of target pulses and local oscillator pulses at the mixer 30, the output difference frequency will change, either up or down, so that the energy division effected at filters 36 and 37 will no longer be equal, but one will receive more energy than the other depending on whether the local oscillator pulse is delayed or advanced relative to the target pulse. In such case the differential amplifier 40 will supply an error signal of appropriate algebraic sign to correct the delay of the adjustable delay trigger generator 42. The system thus seeks always to maintain equal division of energy in the filters 36 and 37.

With switch 34 in the search position the local oscillator pulses occur over a linearly increasing range of times, with respect to transmitted pulses, until a visual response is observed in the indicator of the system, which occurs when target and local oscillator pulses correspond in time, or have sufficient time overlap.

Clutter return is obviously non-coherent with the variation of local oscillator frequency, or is at random frequency with respect to any instantaneous value of local oscillator frequency. Moreover, the possible range of random frequencies is large, relative to the band widths of the filters 36 and 37. It follows that very little clutter signal response is applied to the differential amplifier 40 or to the indicator. Such response as is applied is random, and hence does provide a consistent error signal of either sign at the output of the differential amplifier 40.

Improvement in effective target signal to clutter ratio obtainable by the system of FIGURE 5 depends on target to clutter echo energy ratio, effective depth of target, and space and amplitude distribution of the clutter components, but should be of the order of 20 db. Since there is no pulse to pulse dependence, as in many MTI systems, the present technique is compatible with such anti-jam devices as frequency jumping and repetition rate jittering.

In accordance with still another modification of the present invention, the signal is compared with itself, frequency-wise, but with a time offset. The presence of the time offset provides the advantages of auto-correlation technique, while the use of the signal to provide comparison signal for itself reduces the complexity of the system of FIGURE 5.

Reference is now made to FIGURES 7, 8 and 9 of the accompanying drawings. In FIGURE 7 echo signal consisting of both target and clutter response is applied to a receiver front end, as in the systems of FIGURES 5 and 6. For $\Gamma=1.75$ $\mu$sec. and $\Delta f=15/\Gamma$, 8.6 mc., the width of the receiver I.F. amplifier may be $\pm 7$ mc., at 60 mc. center frequency. An amplifier and limiter 60 may follow the amplifier 40 to avoid excessive non-linearity in the detector characteristic. The output of amplifier and limiter 60 is applied to a mixer 61, to which is also supplied signal from a fixed frequency oscillator 62. The latter may have a frequency of 25 mc. so that the output of the mixer 61 is 85$\pm$7 mc. The mixer 61 issues into a further mixer 63. To the latter is applied the output of receiver 40, via a delay line 64. The delay line 64 may have a delay time of .07 $\mu$sec., i.e., the reciprocal of the bandwidth of receiver 40, which gives rise to a frequency delay of 0.344 mc. at the beginning of each pulse, as compared with the frequency at the initiation of a pulse supplied by mixer 61.

There is then generated at the output of mixer 63 a frequency compounded of the 25 mc. fixed frequency supplied by the oscillator 62, and the difference in frequencies of the pulse inputs, equal to 0.344 mc.

The output of mixer 63 may then be 25.344$\pm$7 mc. However, this bandwidth is not required by the output target signal, since the latter now contains no frequency modulation. The output of mixer 63 is applied to a filter 65, of bandwidth 1.14 mc. and pass-band 25.344$\pm$0.57 mc., i.e., adequate to pass the amplitude modulated R.F. pulse, containing no components, applied thereto. The R.F. pulse so selected is detected in detector 66, and is then applied to a suitable indicator, as in the system of FIGURE 5.

Receiver noise presents a limitation on detection of targets beyond the clutter, since the very side bandwidth required in the amplifier 40 to include the spectrum of the frequency modulated pulses admits excessive noise, which must be reduced to a bandwidth appropriate to amplitude modulation of the pulses alone, if loss of sensitivity is to be avoided. In essence, signal bandwidth must be compressed while both clutter and noise remain distributed over as wide a band as possible.

Receiver noise becomes essentially uncorrelated after an interval equal to the reciprocal of the receiver bandwidth. Accordingly, in the system of FIGURE 7 incoming signal is delayed in delay device 64 by a time equal to the reciprocal of receiver bandwidth, and the delayed signal is combined with the undelayed signal in mixer 63. It follows that noise in the broad-band amplifier 40 is discriminated against.

Power density of a received signal spectrum, in the output of the mixer 63, is found to have the tent-like shape illustrated in FIGURE 8 of the accompanying drawings, wherein power density is plotted against instantaneous frequency difference of the combined signals.

Since a bandwidth of 20 or more times the reciprocal of the pulse length is utilized, the loss in effective pulse width due to reduction of pulse overlap time in the mixer 63 is 5% or less, and may be neglected. In the overlap interval the signal voltages are correlated, and provide a constant different frequency with phase coherence. The pulse spectrum at the output of mixer 63 is thus only slightly greater than that predicated on amplitude modulation of the original pulse, alone.

The clutter return contains at all times all of the frequencies in the transmitted spectrum. The difference frequency band, at the output of mixer 63, will have twice the spread of the transmitted spectrum, with power density having maximum at the center frequency and linear decreases on either side. (See FIGURE 8.) Zeros will occur at about plus and minus twice the total frequency modulation. Hence, the filter 65 eliminates the major portion of the clutter spectrum. Expected target signal to clutter improvement is dependent on clutter and signal distributions. With a frequency change per pulse of 10 times the reciprocal of pulse length, the distribution of signal and clutter energy is plotted in FIGURE 9. Power density is given approximately by $$\frac{\sin^2 w}{w^2}$$

where $w$ is the abscissa of FIGURE 9 is equal to $$\frac{\Gamma f}{\Gamma}$$

Signal power is then $$P_s \int_0^\alpha \frac{\sin^2 w}{w} dw = \frac{\pi}{2}$$

Clutter power density distribution is triangular with base width $$\frac{2F}{\Gamma}$$

where $$\frac{F}{\Gamma}$$

is the frequency change which occurs in pulse carrier during the pulse. The area under the clutter density curve is then $$\frac{F}{\Gamma}$$

and the ratio of total clutter power to clutter power contained in the signal spectrum, at the output of filter 65, is $$\frac{2F}{\Gamma}$$

With frequency modulation of $$\frac{10}{\Gamma}$$

the calculated improvement is 13 db, with $$\frac{15}{\Gamma}$$

is 14.8 db, and with $$\frac{20}{\Gamma}$$

is 16 db.

Receiver noise may be treated in the same manner as clutter signal. Hence, the signal to noise improvement obtained at filter 65 just balances the loss incurred by reason of the increased bandwidth of amplifier 40.

While I have described and illustrated one specific embodiment of my invention, it will be clear that variations of the general arrangement and of the details of construction which are specifically illustrated and described may be resorted to without departing from the true spirit and scope of the invention as defined in the appended claims.

What I claim is:

1. A frequency modulated pulse system, comprising a transmitter for transmitting linearly frequency modulated pulses to a target adjacent a clutter area, the extent of frequency modulation during each pulse length being sufficient to extend the width of the frequency spectrum of the transmitted pulses by a factor of at least four over the spectrum of pulses of corresponding length which are substantially lacking in frequency modulation, said system further including means for receiving frequency modulated radio frequency echo pulses and clutter signals from said target and from said clutter area comprising a broad-band receiver of the superheterodyne type having at least one intermediate frequency amplifier designed for receiving said frequency modulated radio frequency echo pulses and said radio frequency clutter signals without substantial distortion, means for heterodyning said frequency modulated radio frequency target pulses and said frequency modulated radio frequency clutter signals with a signal having linear frequency modulation correlated in extent and rate of change with said frequency modulated radio frequency echo pulses, whereby is derived secondary radio frequency echo pulses having substantially no frequency modulation, and means for amplitude detecting said last-mentioned pulses, said means for amplitude detecting including two frequency separated channels each arranged to accept a substantial portion of the energy of said radio frequency target pulse having substantially no frequency modulation, and means for differentially combining the outputs of said two channels to derive an error signal.

2. A frequency modulated pulse system, comprising a transmitter for transmitting frequency modulated pulses to a target adjacent a clutter area, the extent of frequency modulation during each pulse length being sufficient to extend the width of the frequency spectrum of the transmitted pulses by a factor of at least four over the spectrum of pulses of corresponding length which are substantially lacking in frequency modulation, means for receiving radio frequency echo pulse and clutter signals from said target and from said clutter area, a broadband receiver of the superheterodyne type having at least one intermediate frequency amplifier designed for receiving and passing said radio frequency echo pulses and said radio frequency clutter signals without substantial distortion, means for heterodyning said frequency modulated radio frequency echo pulses and said frequency modulated radio frequency clutter signals with a heterodyne signal having frequency modulation correlated in extent and rate of change with said frequency modulated radio frequency echo pulses, whereby is derived radio frequency target pulses having substantially no frequency modulation, means for generating said heterodyne signal comprising a delay device responsive to said frequency modulated radio frequency echo pulse.

3. A receiver for frequency modulated echo in the presence of clutter return, and wherein said frequency modulation of said echo pulses during each pulse is sufficient to extend the width of the frequency spectrum of the pulses by a factor of at least four over the spectrum of pulses of corresponding length which are substantially lacking in said frequency modulation pulses comprising a first pass channel having a predetermined limited bandwidth approximately just adequate to receive said echo pulses with accompanying clutter return, a second pass channel, means applying said frequency modulated echo pulses in parallel to said first and second channels, said second channel including a delay device having a delay time at least equal to the reciprocal of said predetermined band-width, means for heterodyning the outputs of said channels and a filter connected in cascade with said means for heterodyning, said filter having a bandwidth narrower than said predetermined bandwidth by a factor of at least two, said predetermined bandwidth being adequate to accept said frequency modulated radar echo pulses substantially without distortion and without said clutter return.

4. The combination according to claim 3 wherein said filter has a bandwidth no greater than required to pass without substantial distortion radio frequency pulses free of frequency modulation and having lengths equal to said echo pulses.

5. A system for receiving a frequency modulated radio frequency pulse, comprising a first channel of finite bandwidth for passing said frequency modulated pulse substantially without distortion, a second channel for passing said frequency modulated radio frequency pulse without distortion, a delay device in said second of said channels having a delay approximately equal to the reciprocal of the bandwidth of said first channel, and means for heterodyning the outputs of said channels.

6. A system for receiving a pulse having substantially linear frequency modulation from frequency $f_1$ to frequency $f_2$, where $f_1 - f_2$ is at least $$\frac{8}{\Gamma}$$

where $\Gamma$ is the length of said pulse, a first channel having a finite bandwidth at least as great as is required to pass said pulse, a second channel in parallel with said first channel, a delay device in said second channel having a delay time of the order of the reciprocal of said bandwidth, and means for heterodyning the signal outputs of said first and second channels.

7. In combination, a source of transmitted frequency modulated pulse carrier signals having a frequency spectrum wider by a factor of at least five than the spectrum corresponding with pulse amplitude of said signals, means for returning said pulse carrier signals from a target as target signals and as clutter signal from a cluter source in time overlapping relation, a receiver for said target signals and said clutter signal, said receiver including processing means for relatively increasing the width of the frequency spectrum of said clutter signal and decreasing the width of the frequency spectrum of said target signals, and a relatively narrow band filter for differentially selecting the spectrum of said target signals from the spectrum of said clutter signal at the output of said processing means.

References Cited in the file of this patent

UNITED STATES PATENTS

| | | |
|---|---|---|
| 2,525,328 | Wolff | Oct. 10, 1950 |
| 2,553,907 | Fleming-Williams et al. | May 22, 1951 |
| 2,624,876 | Dicke | Jan. 6, 1953 |
| 2,638,586 | Guanella | May 12, 1953 |
| 2,659,878 | Mecker et al. | Nov. 17, 1953 |
| 2,839,734 | Hanley | June 17, 1958 |

FOREIGN PATENTS

| | | |
|---|---|---|
| 724,555 | Great Britain | Feb. 23, 1955 |